US007198401B2

(12) United States Patent
Louie

(10) Patent No.: US 7,198,401 B2
(45) Date of Patent: Apr. 3, 2007

(54) WATCH-WINDING APPARATUS

(75) Inventor: Lip Man Louie, Hong Kong (CN)

(73) Assignee: Hero Team Corporation Limited, Kowloon, Hong Kong (CN)

( * ) Notice: Subject to any disclaimer, the term of this patent is extended or adjusted under 35 U.S.C. 154(b) by 272 days.

(21) Appl. No.: 10/895,528

(22) Filed: Jul. 21, 2004

(65) Prior Publication Data

US 2006/0018199 A1 Jan. 26, 2006

(51) Int. Cl.
*G09B 3/00* (2006.01)
*G09D 3/00* (2006.01)
*B01F 11/00* (2006.01)

(52) U.S. Cl. .......................................... 368/206; 81/7.5

(58) Field of Classification Search ................ 368/206, 368/207, 10, 12, 73, 230, 250; 81/7.5
See application file for complete search history.

(56) References Cited

U.S. PATENT DOCUMENTS 5,608,693 A * 3/1997 Richards ...................... 368/10
6,254,270 B1 * 7/2001 Agnoff ....................... 368/206
6,439,761 B1 * 8/2002 Agnoff ....................... 368/206
6,543,929 B1 * 4/2003 Agnoff ....................... 368/206
6,964,513 B1 * 11/2005 Agnoff ....................... 368/206
2005/0254352 A1 * 11/2005 Wolf, V et al. ............ 368/206

FOREIGN PATENT DOCUMENTS

JP 2002129789 A * 5/2002

* cited by examiner

*Primary Examiner*—Vit Miska
*Assistant Examiner*—Jeanne-Marguerite Goodwin
(74) *Attorney, Agent, or Firm*—Alix, Yale & Ristas, LLP

(57) ABSTRACT

A watch winder can automatically wind numerous kind/brand of self-winding watch and maintains the main-spring in ideal tension range. The watch in winding can always be positioned in its favorable showing orientation. The watch in winding can be mounted or dismounted easily. The noise produced by the winder is reduced significantly to a low level. The winder comprises a rotary bowl with central rectangular recess for receiving a cushion holder inserted on the bowl. An electrical noise-proof motor-gear system drives the rotary bowl. An IC circuitry installed under the panel controls the rotation mode of the motor-gear system. A length-wise retractile cushion holder is inserted in the recess with its width tightly fitted for carrying the watch in place. A switch means is installed on the panel with an indicating means for selecting a respective mode to drive the rotary base.

15 Claims, 8 Drawing Sheets

WATCH-WINDING APPARATUS

FIELD OF THE INVENTION

This invention relates to self-winding watches, particularly to an automatic watch-winding apparatus for keeping a self-winding watch wound during periods of non-use.

BACKGROUND OF THE INVENTION

Mechanical wrist watches employ spring wound mechanisms which convert the stored energy of the main-spring into mechanical movement of the watch's hands. Typically, such watches must be hand wound every two or three days to assure continuous operation. If the user forgets to wind the watch, the spring motor will eventually unwind causing the watch to cease operation. Self-winding mechanisms now commonly used in wrist watches are derived from technology dating to the 1930's. Such mechanisms comprise a rotary pendulum in the form of a sector with a swing angle of 120°. The inventive apparatus of this invention is designed for winding such self-winding mechanisms.

Self-winding apparatus has been widely used by watch retailers and watch collectors. However, prior art apparatus have one or more of the following shortcomings:

1) Some apparatus function poorly in terms of exhibition qualities. In a watch shop, the apparatus is not only designed for winding the watch automatically, but also plays a role of exhibition. Therefore, watches carried by such apparatus must always be noticed by the visitor and in its best orientation. But prior art apparatus (such as GB 2233477A, DE 19535229A1, U.S. Pat. No. 6,254,270 B1) are continuously rotating. Some of them (such as U.S. Pat. No. 6,254,270 B1) position the watch in an unfavorable orientation. Thus, a visitor can only see the crown side with no chance to stare at its dial for surveying the detail.
2) Prior art apparatus commonly have not considered the mechanical characteristics of the main-spring. All watches carried by such prior art apparatus are working in a fully-wound condition. Some of them are even advertised to have the feature that any time when the watch is taken from the winder, it will be fully wound. It is a common sense that a main-spring working in fully-wound condition all day long will impair its resiliency and affect the accuracy of the watch.
3) Prior art apparatus commonly employ and use an inconvenient way to carry the watch. This will be an obvious shortcoming in a watch shop, and for other users, since any watch carried by the apparatus may be dismounted and mounted many times every day for visitors. Since the apparatus is typically in a location (such as in a showing window) with limited space, it is very inconvenient to dismount and mount the watch frequently.
4) Since the electric motor and gear system of prior art apparatus should be continuously running in the showing time, it will tend to quickly wear out and produce a terrible noise especially when it is put in/on a resonant location.
5) The user is unable for most prior art apparatus to select mode of operation to closely match the winding specification as required by the movement manufacturers.

SUMMARY OF THE INVENTION

The object of this invention is to provide a self-winding apparatus for mechanical self-winding watches. The apparatus of this invention overcomes shortcomings of some prior art apparatus as mentioned above. The apparatus of this invention can automatically wind a wide range watches and maintain a proper main-spring tension. The apparatus displays the watch in its favorable showing orientation. Watches can easily be mounted and dismounted. The operational noise is reduced.

To achieve the above mentioned objects, the self-winding apparatus of one embodiment of this invention comprises:

a rotary bowl with central rectangular recess for receiving a cushion holder inserted on the bowl;

a bearing underneath the rotary bowl at 6 o'clock (south) position to support the weight of the bowl;

an electrical noise-proof motor-gear system driving said rotary bowl;

an IC circuitry installed under the panel to control the rotation mode of said motor-gear system;

a length-wise retractile cushion holder inserted in a recess with its width tightly fitted for carrying the watch in place; and a switch means installed on the panel with an indicating means for selecting a respective mode to drive the rotary base.

DETAILED DESCRIPTION OF THE PREFERRED EMBODIMENTS

Figure 1:
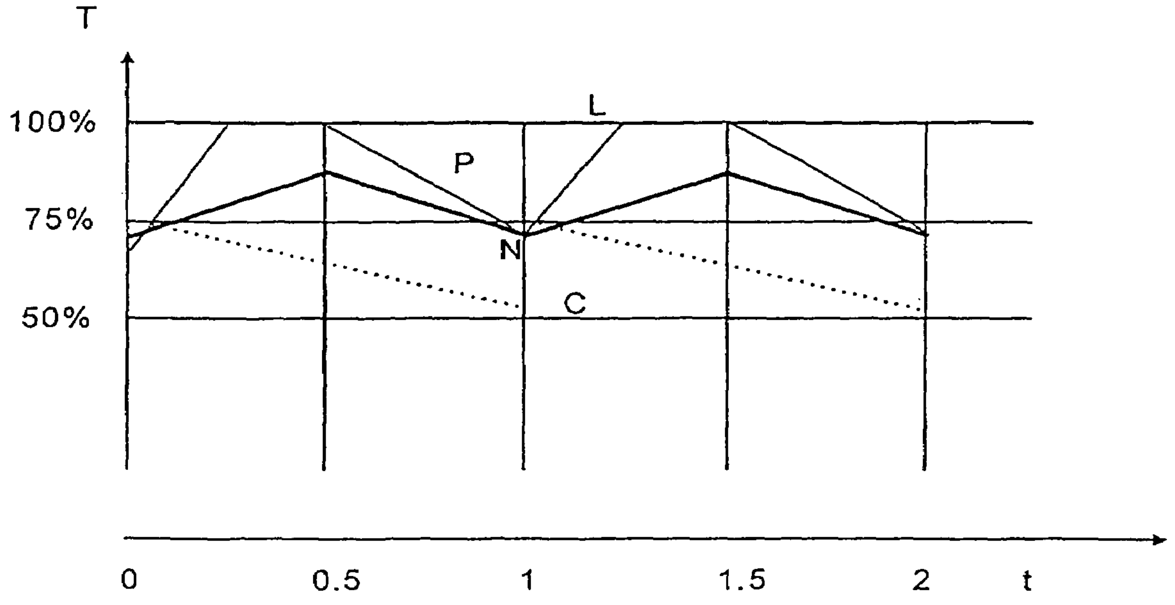
FIG. 1 is a coordinate graph for showing every day tension variation of the main-spring of different kinds of clocks/watches.

FIG. 1 is a coordinate graph for showing the main-spring tension variation for different clocks/watches. The abscissa represents time (t), the unit is (day). The ordinate represents tension (T) in percent, the horizontal line (L) represents fully wound (100%) of any main-spring. The dotted line (C) represents the tension variation of the main-spring of a chronometer (clock). Typically, the captain winds the chronometer (or clock) once every day to a spring tension of, say, 75%; after the clock runs 24 hours, the tension is reduced to 50%. Then the captain is rewound to 75%. Line (C) accordingly has a shape of saw-teeth. For accurate timing, any main-spring is never permitted to be fully wound. Therefore, we can see in FIG. 1 that the dotted line (C) will never touch the horizontal line (L).

In FIG. 1, the thin solid line (P) represents the tension variation of the main-spring of a self-winding watch wound by representative prior art apparatus in a watch shop under typical conditions. In FIG. 1, we suppose the watch has 60% initial tension when it was put on a representative prior art apparatus in the morning. Since such prior art apparatus will over-wind (or fully-wind) the watch after several hours, the watch was fully-wound and the line (P) touches line (L). Then, in the evening when the watch shop is closed, half day has passed. The apparatus has been switched OFF and the line (P) gradually goes down until next morning when the apparatus is to be switched ON. If the shop opens 24 hours a day, line (P) will overlap with line (L).

In FIG. 1, the broad solid line (N) represents the tension variation of the main-spring of a self-winding watch wound by the inventive apparatus of this invention, also in a watch shop. Since by using the apparatus of this invention, the initial tension can be roughly determined by the user, the initial tension can be selected at 70%. Since by using the apparatus of this invention, the winding tempo can also be selected by the user, so line (N) will gradually rise from the initial point (70%) in 12 hours but will never touch line (L). At the close time, when the apparatus is switched OFF, line (N) will also gradually go down. If the shop opens 24 hours a day, line (N) will be a horizontal line parallel to line (L).

By comparison of three lines (C, P, N) shown in FIG. 1, it is obvious that the line (N) is better than line (P) and line (C). In 24 hours operation mode, since line (N) is a parallel line to the abscissa, this represents the best operational mode provided by this invention. Since watches in a watch shop are waiting for sale, using representative prior art apparatus (line P) will impair the watches while using the apparatus of this invention will protect the watches. This is a very important reason for using the watch winder of this invention.

Figure 2A:
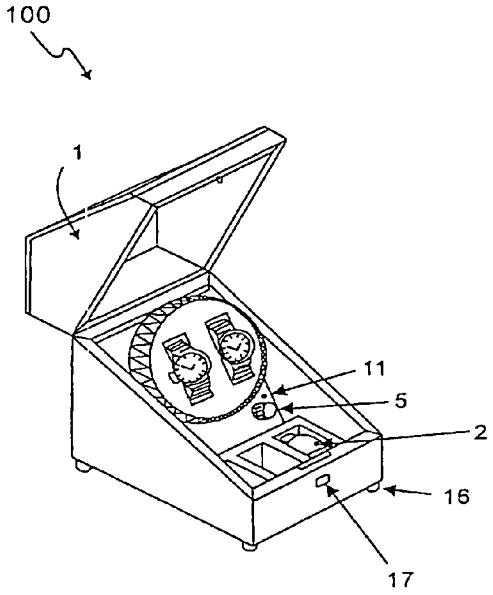
FIGS. 2A and 2B are respectively a perspective and a sectional view for showing the construction of first embodiment of self-winding apparatus of this invention.
Figure 2B:
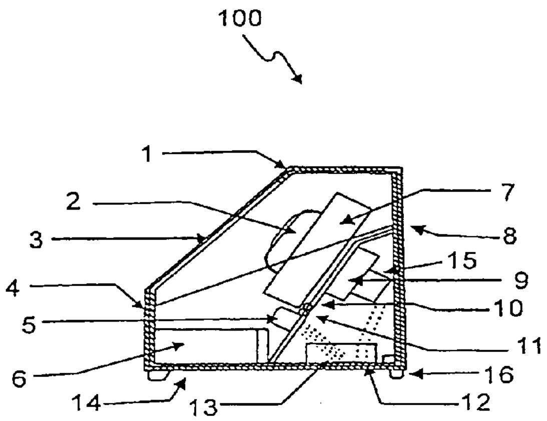

FIG. 2A is a perspective view and FIG. 2B is a sectional view showing the construction of a first embodiment of the self-winding apparatus of this invention. In FIG. 2, the first embodiment of watch winder 100 of this invention has a box-like shape. The lid cover 1 is made of wood. The watch winder 100 includes self-adjustable watch cushion holder 2 (which will be described separately), a glass window of the lid cover 1, a lock 4, a knob 5 for selecting the rotating program (or mode) of the wood round rotating bowl 7 and the frames 6 for receiving an extra watch holder 2. A metal hinge with spring up action joins the lid cover 1 and the lower case. A gear box 9 will also be described in detail below. A bearing 10 supports the wood rotating bowl 7. An LED light 11 indicates the rotating mode now in force. For example, a continuously bright represents normal rotation, a flash can be used to represent time-out, an extinguished light can be used to represent the winder is switched OFF. The winder 100 also employs a circuit board 12. A battery compartment 13, a bottom support 14, a motor 15 and rubber legs 16.

Figure 3A:
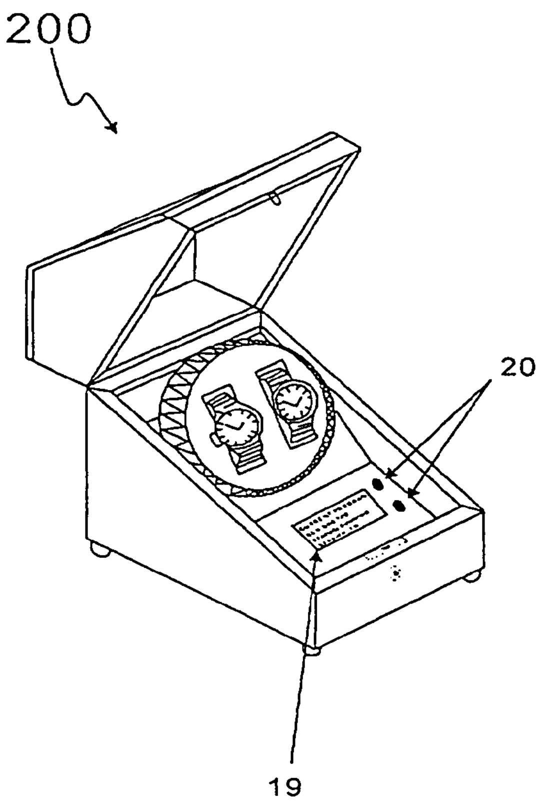
FIGS. 3A, 3B and 3C are respectively a perspective, a sectional and a back view for showing the construction of a second embodiment of a self-winding apparatus of this invention.
Figure 3B:
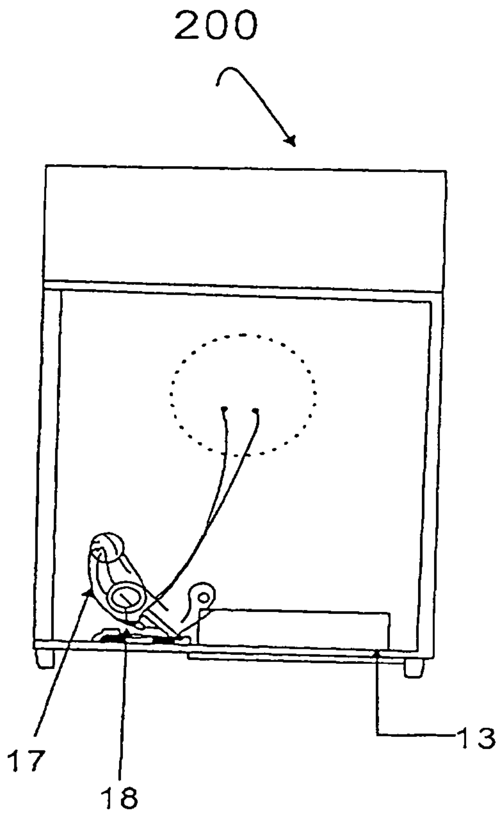
Figure 3C:
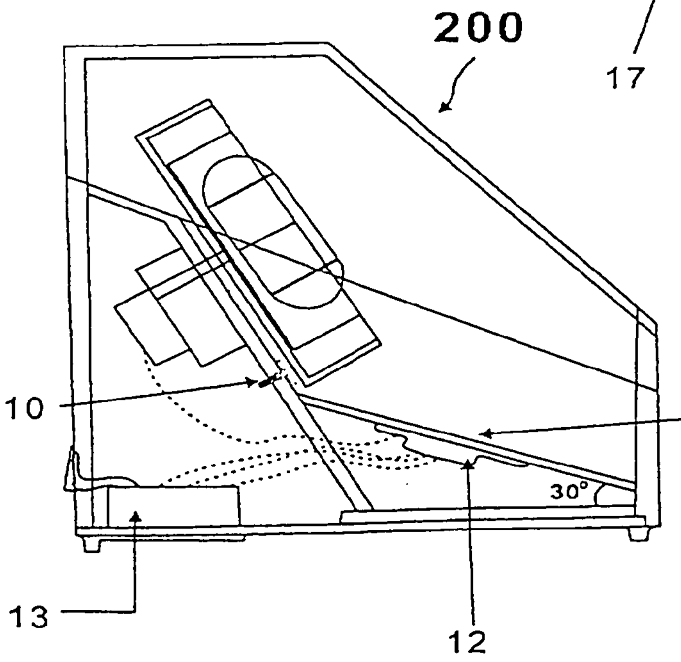
Figure 4A:
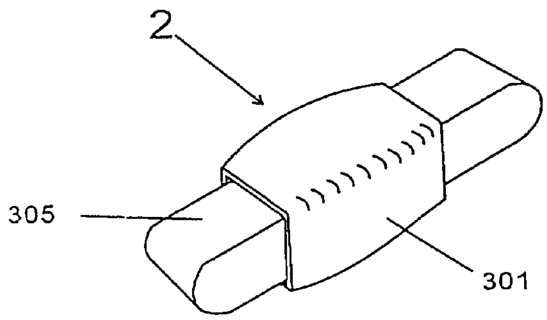
FIGS. 4A, 4B, 4C and 4D are respectively a perspective, a plan, an end, and a sectional view for showing the construction of a cushion holder used in this invention.
Figure 4B:
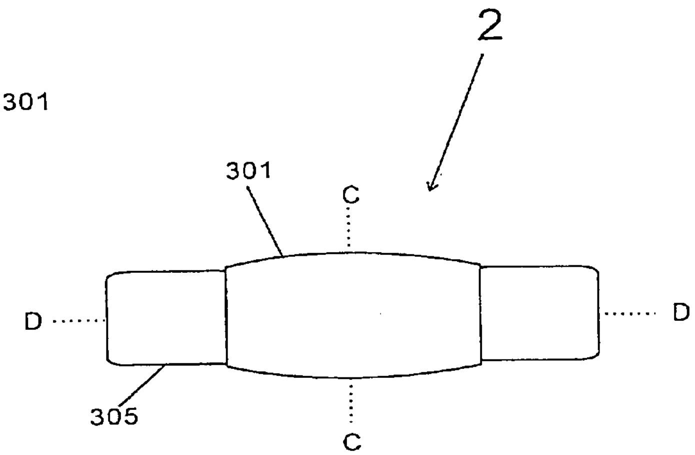
Figure 4C:
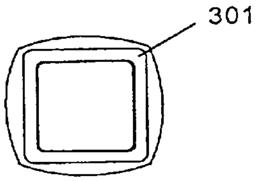
Figure 4D:
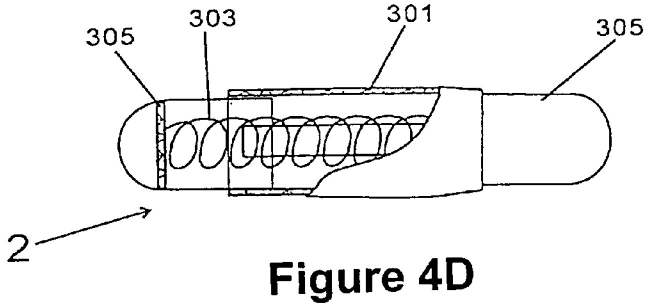

FIGS. 3A, 3B and 3C are respectively a perspective, a sectional and a back view for showing the construction of a second embodiment of a self-winding apparatus of this invention designated by the numeral 200. An LCD Panel 19 with two push buttons 20 replaces the knob 5 of FIG. 2. Therefore, a more accurate, complex electronic control can be performed in this second embodiment. An ON/OFF switch 17 cooperates with two push buttons 20 for controlling the circuit. A DC plug 18 for AC adapter input is included. Circuit board 12 and battery compartment 13 are also installed in different locations than FIG. 2.

For watch winders 100 and 200, the dial of the watch was placed at 45 degree inclines. In prior art U.S. Pat. No. 6,254,270 B1, inclination is required, that is to say, if the axis of rotation is parallel to the ground, the watch will never be wound no matter how quick or how many rotations have been made. In this invention, the inclination is not a requirement. The dial of the watch can be placed 90 degrees perpendicular to the ground, can be placed 45 degrees inclined to the ground (as shown in both FIG. 2 and FIG. 3), or even can be placed in horizontal (that is, parallel to the ground). When the dial of the watch is placed parallel to the ground, only the swing mode with sufficient acceleration can be used to wind the watch. For achieving longer life and simplifying construction of the apparatus of this invention, the horizontal orientation is preferably not employed.

FIGS. 4A, 4B, 4C, and 4D are respectively a perspective, a plan, an end, and a sectional view for showing the construction of cushion holder 2 used in this invention. In this invention, the watch with its band in the form of a loop can be easily pulled onto the self-adjustable watch cushion holder 2. This cushion holder mainly comprises three parts, the outer body 301, the inner sliding part 302 and the pressing spring 303. The spring 303 pushes the inner sliding part outwardly to fully embrace the watch band loop. With this inventive cushion holder 2, the loop can be easily mounted (the watch with closed band) onto cushion holder 2 and inserted into the slot on the bowl 7. The number of slots in bowl 7 is not limited. In this specification, two slots are illustrated on the front surface of the bowl 7, but one slot or a plurality of slots in different orientations is also within the scope of this invention. A spare cushion holder 2 can also be provided with the apparatus of this invention. Since the middle portion of the outer body 301 is padded with medium soft foam, once two side surfaces are inserted into a matched slot, the friction force will be large enough to prevent the withdrawal of the cushion holder 2 and the watch supported by it.

The insert-in construction of this cushion holder 2 can withstand significant acceleration in the swing mode when the dial of watch is placed in horizontal orientation. Prior art forms of carrying the watch may encounter problems with even minor acceleration.

Figure 5A:
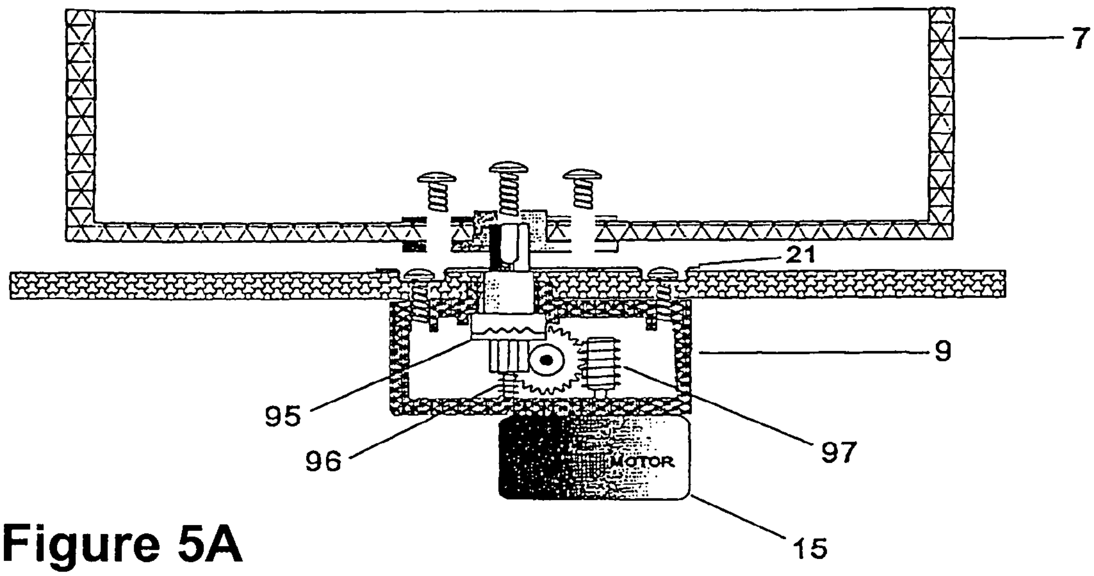
FIGS. 5A and 5B are respectively a top and a sectional view for showing the construction of gear box used in this invention.
Figure 5B:
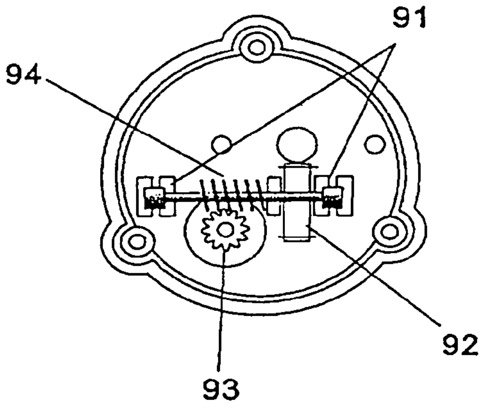

FIG. 5A is a top view and FIG. 5B is a sectional view showing the construction of gear box 9 used in this invention. In the sectional view, the wood round rotating bowl 7 is mounted by conventional means on the output shaft of the gear box 9. A metal plate 21 isolates the gear from the wood box. By using the metal plate 21, the gear box 9 is not directly installed on the wood box, but suspended from the wood box. This construction will greatly reduce the noise resonated by the wood box. Input rotation from the motor 15 is transferred through two pairs of worm-gear 97-92, 94-93 to a plastic POM helical gear 95. As shown in the sectional view, the plastic POM helical gear 95 is flexibly coupled with gear 93. When the transmitted torque suddenly increases, the spring 96 will be compressed. This will absorb the vibration. Therefore, the noise caused by sudden increasing of the torque is now reduced by the plastic POM helical gear 95. Gear 95 has a split clutch system (2 plans with jee-saw shaped surfaces). If someone tries to turn the wood bowl 7 manually, the lower part of the clutch system which has spring cushioning will slip away from the upper part of the clutch. This feature will ensure that the core of the gear and motor system will not be damaged by manual manipulation of the rotary bowl. Therefore, the gear box 9 of this invention will greatly suppress noise in comparison to representative prior art devices.

Figure 6:
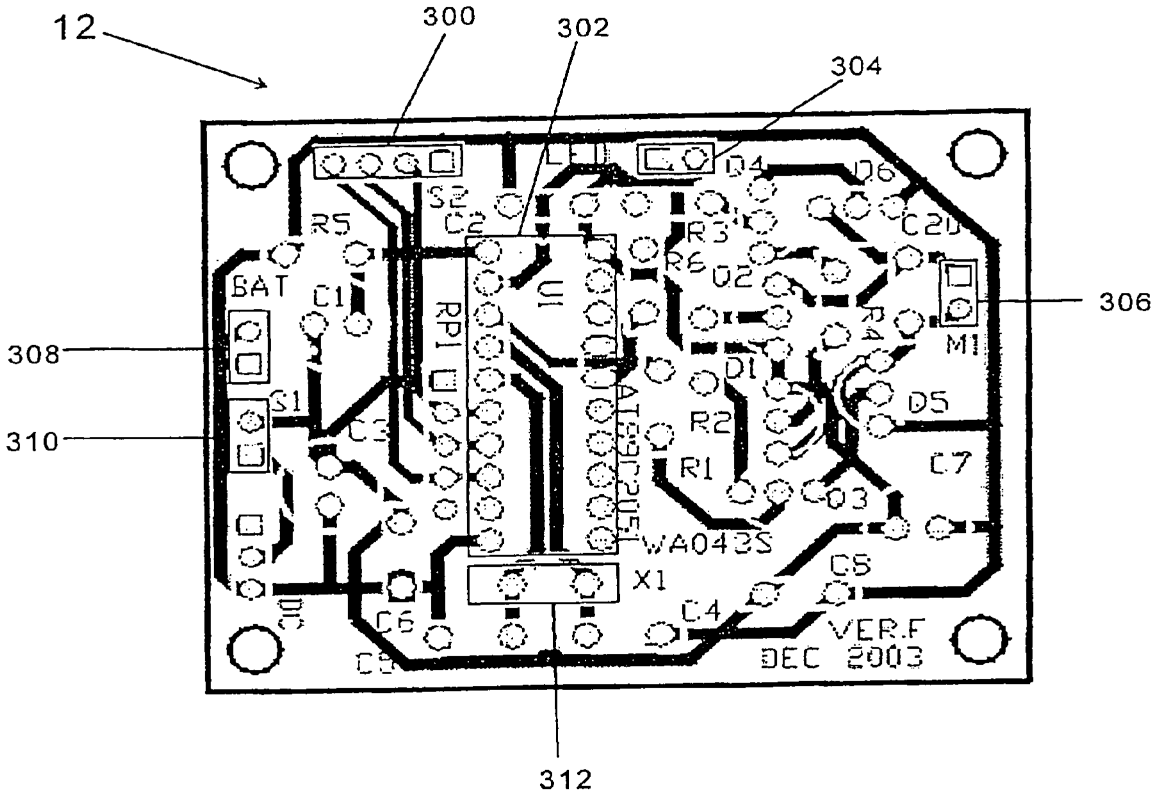
FIG. 6 is a top view, partly annotated and partly in schematic, of a printed circuit board used in this invention.

FIG. 6 is a top view of the printed circuit board (PCB) 12 which has been annotated and schematically illustrated. This is the electronic control for the rotating mode of this invention. The parts list for the circuit board is listed in TABLE I.

This programmable electronic control used in this invention has two embodiments, one is shown in FIG. 2 and one is shown in FIG. 3. In FIG. 2, since only one knob 5 is used, the user can not set the program himself. The user only can select any of the modes preset by the manufacturer of the watch winder 100. In FIG. 3, since there are two push buttons 20 and the LCD panel, the user can set the program himself. The input program is stored in the PCB 12, and the PCB 12 will output command to the motor per the schedule. Of course, any electronically controlled motor can run in any direction and start-stop per the schedule. The electronic circuitry has the same function of programming for winder 100 and winder 200. Therefore, it can give order to the motor to rotate or to stop per a programmed time schedule.

The printed circuit board 12 interfaces with the principal components as follows: Socket 300 receives the signal from the program selector knob 5 or buttons 20. Socket 302 holds an integrated circuit chip. The programming and function control are stored and sealed into the IC chip. Socket 304 connects to the LED light. Socket 306 connects to the motor 15. Socket 308 connects to the battery compartment 13. Socket 310 connects to the DC input 18 from an AC adapter.

A principal difference between this invention and prior art is the winding mode which is carried out by electronic control. As mentioned above, the automatic mode of this invention is started from 70% tension (T) of the main-spring. Therefore, a lot of information which was not needed by any prior art device must be collected by the user himself and input into the electronic control (the chip on the PCB). When a new watch is bought, it is manually wound with the crown until it is fully wound. The watch is then put in a steady location and how many hours it will be run is recorded, for example, 48 hours will be run after fully wound. Then, manually fully wind the watch once again and accurately record how many turns of the crown have been wound. For this purpose, we can hold the crown and turn the watch. For example, 30 turns will fully wind the watch. Now, we can roughly know the ratio of crown turns versus running hours. That is, 15 turns of the crown will make the watch run 24 hours or 50% (T). Then, we let the fully wound watch stay in a steady location for 24 hours and then wind the watch crown and record the turns. Theoretically, the watch will be fully wound by 15 turns of crown. But since the main-spring has a nonlinearity character, the result will not be 15 turns. For example, 12 turns can fully wound the watch. Then, we get the result (ratio): each turn of the crown above 50% (T) condition will cause the watch to run 2 hours.

The next step is to fully wind the watch and put it in a steady location for 24 hours. Then the watch is put in the slot of bowl 2 (or any convenient place) and rotated 200 turns in a short time, say, in several minutes. Then the watch is put in a steady location and how many hours the watch will run is recorded. Thus we can get the ratio for rotation versus hours. For example, above 50% (T) condition, each hour will need the watch to be rotated 30 times.

Figure 7:
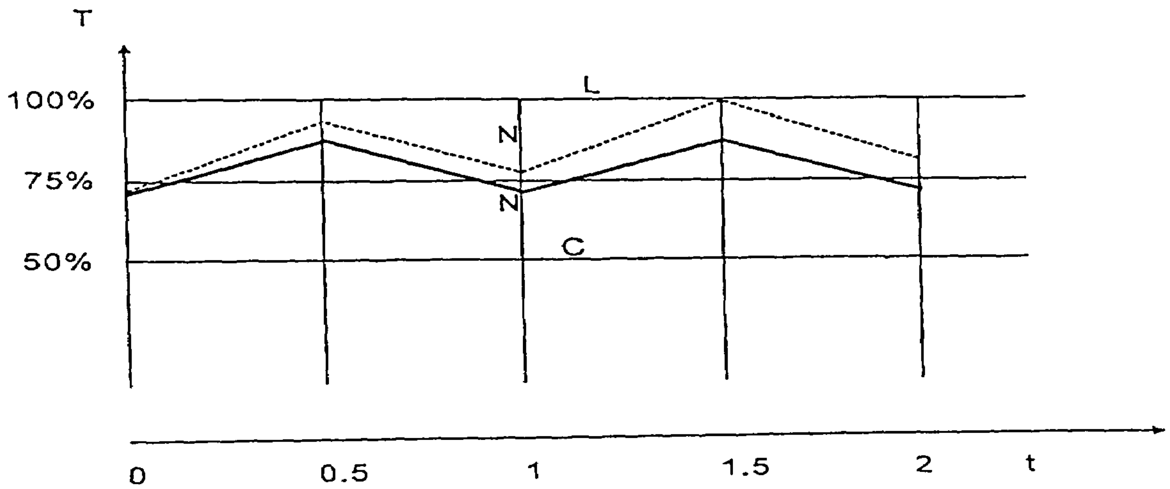
FIG. 7 is a coordinate graph for showing the deviation caused by incorrect programming.

Therefore, when the winder 200 of this invention is employed to automatically wind the watch, we can fully wind the watch manually and put it in the slot of bowl 2. The program is then set as: 12 hours to let the (T) of the main-spring reduce to 70%. The watch then rotates 720 times in 12 hours (if the watch winder is working 12 hours and stop 12 hours every day), and stop 12 hours. The characteristic curve of this mode will be the same as line (N) in FIG. 1. Since every mechanical device has its tolerance, such a settled program exhibits some deviation in practice. Refer to FIG. 7, the dotted line (N') has a plus deviation (upwardly) caused by incorrect programming. Therefore, after a short period, say, one week, the watch can be automatically checked by fully winding it manually and recording the turns of the crown. Then compare the record is compared with FIG. 1. For example, the theoretic curve shows that we have to wind the crown 6 turns but actually we only wind 4 turns. Thus, we know that the deviation in one week is 2 turns (4 hours) plus. Therefore, we can revise our program setting accordingly. After revision, the deviation will be reduced. Therefore, we can set the program to have a quick automatic full-winding every month. Thus, every month, the watch is automatically fully wound and started on its new cycle from 70% (T). In doing so, the watch automatically wound by the watch winder of this invention will never be running in fully wound condition as characteristic of prior art devices.

For exhibition purpose, the rotation program can be set as 30 minutes in rotating, then 15 minutes in stopping repeated periodically. The stop time is designed to provide an inspection opportunity to the visitors and allow the reserved power of the wound spring to partially dissipate to avoid over winding the watch. Of course, the ratio of the rotating time and stopping time can be decided by the user. The program has daily auto repeat function so that the apparatus can wind a watch up for an extended period of time unattended. Also for exhibition purpose, we can adopt the swing mode instead of the rotating mode. In doing so, the watch will never be in up-side-down orientation.

Figure 8:
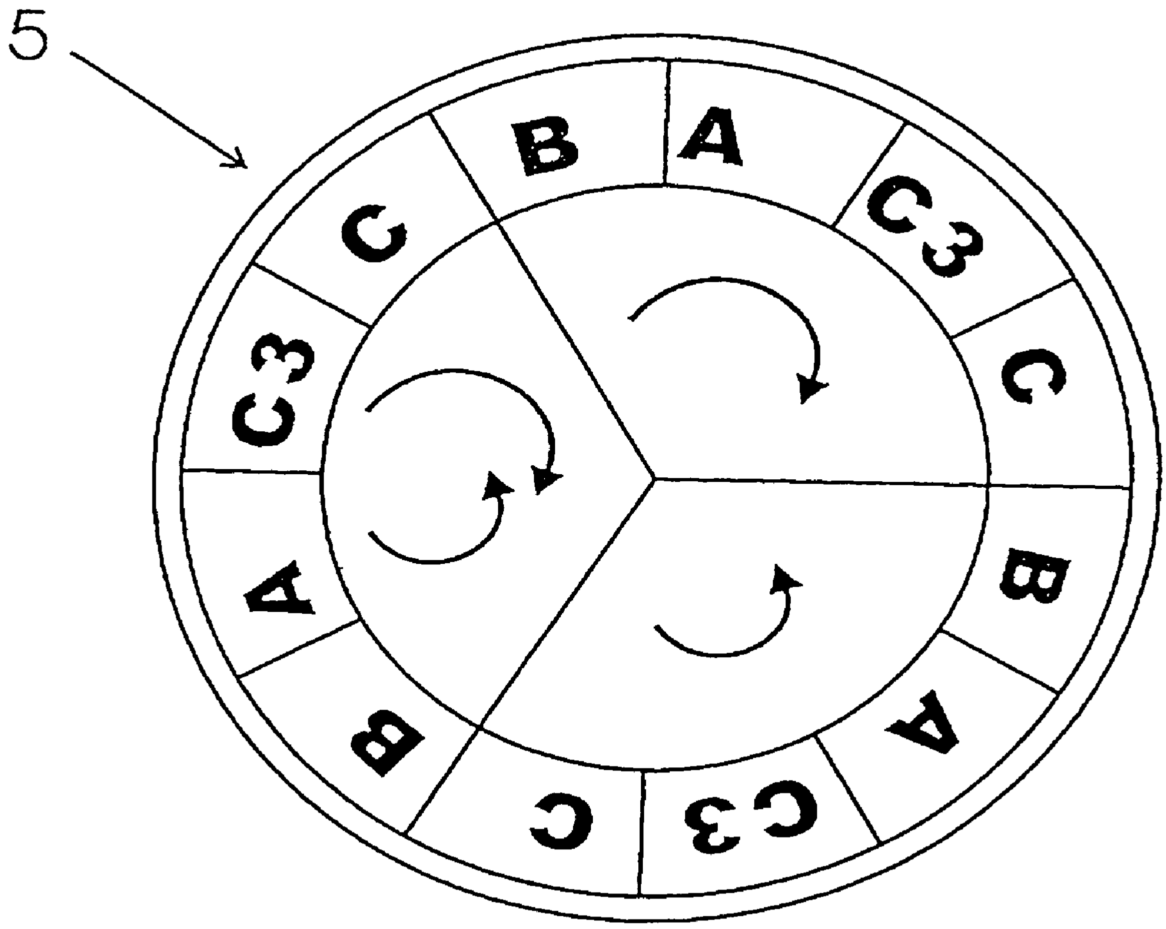
FIG. 8 is an enlarged drawing of a dial face of one-knob in FIG. 2.

Winder 100 is designed for those who have no interest in setting the watch winder themselves. So the manufacturer of the watch winder of this invention provides several programs for widely used watches. Most adopted automatic self-winding mechanisms will be fully wound at 650 or at 850 rotations. The user only should select the program suitable for his watch by a selector switch (see knob 5 in FIG. 1 and FIG. 8). In FIG. 8, the dial face of knob 5 has 12 positions, but this is not a limitation for using 12-position selector switch. In fact, the position number of the selector switch is not limited in this invention, for example, a 18-position selector switch is also usable in this invention. FIG. 8 shows there are 3 groups in the dial face. The first group is rotating clockwise, the second group is rotating anti-clockwise and the third group is partially rotating in both directions (we call it “swing” as above mentioned). Each group consists 4 positions. The symbol “A”, “B”, “C” and “C3” each represents rotations per day, for example, “A” represents 950 rotations a day, “B” represents 850 rotations a day, “C” represents 650 rotations a day, “C3” represents rotation for 3 hours continuously. Thus if a watch stops, “C3” can be selected so the user can use the watch in a rush.

The factory-set program in the watch winder of this invention will automatically fully wind the watch and release the power reserve of a watch periodically by resting. Thus, the working curve of the watch will always be between the range of 50% to 100% (T). This is very important in 24 hours working mode, such as for the watch collector who stores a lot of watches in his office or in his home. Even in watch shops, the watch winder of this invention is recommended to adopt 24 hours working mode. This will also prevent the spring of the watch from achieving excessive tension.

TABLE 1

| PART | TAG | PARAMETER |
|---|---|---|
| resistance | R1 | 1K5 |
| resistance | R2 | 39 |
| resistance | R3 | 1K5 |
| resistance | R4 | 39 |
| resistance | R5 | 10K |
| resistance | R6 | 470 |
| resistance | R7 | 10K |
| resistance | R8 | 10K |
| resistance | R9 | 10K |
| transistor | Q1 | S8550 |
| transistor | Q2 | S8550 |
| transistor | Q3 | S9014 |
| transistor | Q4 | S9014 |
| transistor | Q5 | S8050 |
| transistor | Q6 | S8050 |
| capacitor | C1 | 10 U/16 V |
| capacitor | C2 | 104 |
| capacitor | C3 | 100 U/25 |
| capacitor | C4 | 20 P |
| capacitor | C5 | 20 P |
| capacitor | C6 | 104 |
| capacitor | C7 | 100 U/25 |
| capacitor | C8 | 104 |
| capacitor | C20 | 104 |
| IC socket | ICSET | 20 P |
| circuit board | PCB | WA043 |
| crystal | XTL | 12 M |
| C3 socket | S1 | C3 × 2 P |
| C3 socket | BAT | C3 × 2 P |
| C3 socket | M1 | C3 × 2 P |
| C3 socket | LED | C3 × 2 P |
| C3 socket | DC | C3 × 3 P |
| C3 socket | S2 | C3 × 4 P |
| IC | U1 | AT89C2051 |

What is claimed:

1. A watch winder for a self-winding watch comprising:

a rotary bowl with central recess for receiving a cushion holder;

an electrical noise-proof motor-gear system for rotatably driving said rotary bowl;

a circuit to control the rotation mode of said motor-gear system;

a box for housing said bowl, motor-gear system and circuitry;

a length-wise retractable cushion holder inserted in said recess with its width tightly fitted for carrying the watch in place; and a switch means communicating with said circuitry and having an indicating means for selecting a mode to drive the rotary bowl, wherein said motor-gear system includes a gear box which is suspended from the box for suppressing noise.

2. A watch winder for a self-winding watch as in claim 1, wherein said bowl has a front surface defining a plurality of recesses for each receiving a cushion holder.

3. A watch winder for a self-winding watch of claim 1, wherein there is a bearing underneath the bowl to support the bowl.

4. A watch winder for a self-winding watch as in claim 1, wherein said box is comprised of a lid and a lower case portion.

5. A watch winder for a self-winding watch as in claim 1, wherein said circuit includes a printed circuit board which can store an input program and generate an output command to the motor in a scheduled sequence.

6. A watch winder for self-winding watches as in claim 5, wherein said one-knob has a dial face which uses symbols to indicate a plurality of positions in groups.

7. A watch winder for a self-winding watch as in claim 1, wherein said cushion holder comprises an outer body, an inner sliding part and a pressing spring which makes opposing ends of the cushion holder compressible and expandable to fit a range of watch band loop sizes.

8. A watch winder for a self-winding watch as in claim 1, wherein said cushion holder is padded with medium soft foam on its middle portion and defining two side surfaces wherein when said two side surfaces are inserted into matched recesses, the friction force caused by said foam will be large enough to prevent the dismounting of the cushion holder and the received watch.

9. A watch winder for a self-winding watch as in claim 1, wherein said switch means comprises a one-knob selector switch for selecting a factory-set program and the indicating means is a LCD.

10. A watch winder for a self-winding watch as in claim 1, wherein said switch means comprises two push buttons and the indicating means is a LCD panel to input a program into the circuitry.

11. A watch winder for a self-winding watch comprising:

a rotary bowl with central recess for receiving a cushion holder;

an electrical noise-proof motor-gear system for rotatably driving said rotary bowl;

a circuit to control the rotation mode of said motor-gear system;

a box for housing said motor-gear system and circuitry;

a length-wise retractable cushion holder inserted in said recess with its width tightly fitted for carrying the watch in place; and a switch means communicating with said circuitry and having an indicating means for selecting a mode to drive the rotary bowl wherein said motor-gear system includes a gear box which uses a plastic helical gear to absorb vibration.

12. A watch winder for a self-winding watch as in claim 11, further comprising a spring to absorb vibration.

13. A method for using a watch winder comprising:

manually winding the watch with the crown until it is fully wound;

placing the watch in a steady position and recording how many hours will be run;

manually fully winding the watch once again and accurately recording how many turns of the crown have been wound;

recording the ratio of crown turns to running hours;

again fully winding the watch and placing it in a steady position for half of its full range;

then winding the watch crown and recording the turns;

recording the number of winding per hour when the main-spring is in 50%–100% tension range;

fully winding the watch and placing it in a steady position for half of its full range;

placing the watch in the watch winder and rotating it multiple rotations in a short time;

putting the watch in a steady position and recording how many hours will be running;

recording the ratio of the hours to the number of rotations;

fully winding the watch manually; and placing it in a watch winder and setting the program according to the ratios.

14. The method of claim 13, wherein the number of recorded hours in a steady location is 48.

15. The method of claim 13, wherein the watch is rotated 200 rotations in a short time.

* * * * *